(12) United States Patent
Matsuura et al.

(10) Patent No.: US 9,983,095 B2
(45) Date of Patent: May 29, 2018

(54) OPTICAL FIBER CHARACTERISTIC MEASURING DEVICE

(71) Applicant: YOKOGAWA ELECTRIC CORPORATION, Tokyo (JP)

(72) Inventors: Satoshi Matsuura, Tokyo (JP); Osamu Furukawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days. days.

(21) Appl. No.: 15/255,545

(22) Filed: Sep. 2, 2016

(65) Prior Publication Data

US 2017/0067794 A1    Mar. 9, 2017

(30) Foreign Application Priority Data

Sep. 7, 2015   (JP) .................................. 2015-175901

(51) Int. Cl.
*G01D 5/353* (2006.01)
*G01M 11/00* (2006.01)

(52) U.S. Cl.
CPC ..... *G01M 11/3172* (2013.01); *G01D 5/35364* (2013.01); *G01M 11/3181* (2013.01)

(58) Field of Classification Search
CPC .................................................. G01D 5/35364
See application file for complete search history.

(56) References Cited

U.S. PATENT DOCUMENTS

| 5,880,824 | A | 3/1999 | Uchiyama et al. | |
|---|---|---|---|---|
| 2011/0090936 | A1* | 4/2011 | Kupershmidt | G01D 5/35364 374/142 |
| 2016/0273999 | A1 | 9/2016 | Hotate et al. | |
| 2017/0059428 | A1* | 3/2017 | Hill | G01K 11/32 |

FOREIGN PATENT DOCUMENTS

| JP | 3095694 B2 | 10/2000 |
|---|---|---|
| JP | 2012-63146 A | 3/2012 |
| JP | 5105302 B2 | 12/2012 |
| WO | 2014/034638 A1 | 3/2014 |

OTHER PUBLICATIONS

Yosuke Mizuno et al., "Stable Entire-Length Measurement of Fiber Strain Distribution by Brillouin Optical Correlation-Domain Reflectometry with Polarization Scrambling and Noise-Floor Compensation", Applied Physics Express, 2009, vol. 2.

* cited by examiner

*Primary Examiner* — Shawn Decenzo
(74) *Attorney, Agent, or Firm* — Sughrue Mion, PLLC

(57) ABSTRACT

An optical fiber characteristic measuring device of the present invention includes a light source, an optical divider, an optical waveguide, a first separator, a second separator, a first interferer, a second interferer, and a calculator. The light source is configured to generate a frequency modulated continuous wave of light. The optical divider is configured to divide the frequency modulated continuous wave of light into first and second divided-waves of light. The optical waveguide is configured to guide the first divided-wave of light to one end of an optical fiber to be measured. The first separator is configured to separate a backscattered light generated by Brillouin scattering of the first divided-wave of light in the optical fiber to be measured into a first scattered light, which is a linearly polarized light, and a second scattered light, which is a linearly polarized light perpendicular to the first scattered light.

14 Claims, 6 Drawing Sheets

OPTICAL FIBER CHARACTERISTIC MEASURING DEVICE

BACKGROUND OF THE INVENTION

Field of the Invention

The present invention relates to an optical fiber characteristic measuring device, and particularly to an optical fiber characteristic measuring device which measures characteristics of an optical fiber on the basis of backscattered light generated due to Brillouin scattering in the optical fiber to be measured.

Priority is claimed on Japanese Patent Application No. 2015-175901, filed on Sep. 7, 2015, the contents of which are incorporated herein by reference.

Description of Related Art

Brillouin scattering generated when light is incident on optical fibers, which are one of optical transmission media, is changed in accordance with a strain applied to the optical fibers or a temperature of the optical fibers. A method of measuring a strain distribution or a temperature distribution in a longitudinal direction of optical fibers by measuring an amount of frequency shift of light caused by Brillouin scattering is known. For example, a strain generated on structures such as bridges and buildings can be detected by stretching optical fibers around the structures, and specifying distorted places of the optical fibers on the basis of the above-described method. So-called Brillouin optical time domain reflectometry (BOTDR) and Brillouin optical correlation domain reflectometry (BOCDR) methods are known as such a measuring method.

As disclosed in Japanese Patent No. 3095694, a measuring method of a BOTDR method includes detecting Brillouin scattered light obtained when a light pulse is incident on one end of an optical fiber to be measured, and measuring an amount of frequency shift of the Brillouin scattered light with respect to the incident light (hereinafter referred to as an amount of Brillouin frequency shift) and a time until the Brillouin scattered light is returned. The Brillouin scattered light is backscattered light scattered due to an acoustic wave whose speed is changed depending on a strain or a temperature of the optical fiber to be measured. A magnitude of the strain or a temperature of the optical fiber to be measured can be measured by measuring the above-described amount of Brillouin frequency shift, and a position in a longitudinal direction of the optical fiber to be measured can be specified by measuring a time until the Brillouin scattered light is returned.

There is a need to narrow a pulse width of an optical pulse incident on one end of the optical fiber to be measured to improve a spatial resolution in the above-described measuring method of the BOTDR method. However, when a pulse width of an optical pulse is narrow, a signal intensity of backscattered light generated in an optical fiber to be measured is reduced, and a signal-to-noise ratio (hereinafter referred to as an SNR) is deteriorated in some cases. In some cases, it takes a lot of times for measurement because it is necessary to increase a process of integrating backscattered light to improve the deteriorated SNR.

On the other hand, a measuring method of a BOCDR method includes detecting Brillouin scattered light obtained when a pump light serving as a frequency modulated continuous wave of light is incident on one end of an optical fiber to be measured, and measuring an amount of Brillouin frequency shift. As disclosed in Japanese Patent No. 5105302 and Yosuke MIZUNO, Zuyuan H E, and Kazuo NOTATE, "Stable Entire-length Measurement of Fiber Strain Distribution by Brillouin Optical Correlation-domain Reflectometry with Polarization Scrambling," The Institute of Electronics, Information and Communication Engineers, the 2009 IEICE General Conference, C-3-88, Ehime University, Mar. 17 to 20, 2009, in the measuring method of the BOCDR method, Brillouin scattered light at a specific position, which is called a correlation peak, in an optical fiber to be measured is selectively extracted by making the Brillouin scattered light and reference light to interfere with each other. For example, when a continuous wave of light which undergoes sinusoidal wave frequency modulation is incident on an optical fiber to be measured, an interval of correlation peaks in the optical fiber to be measured is inversely proportional to a modulation frequency of the sinusoidal wave frequency modulation. For this reason, a modulation frequency of the continuous wave of light is adjusted such that only one correlation peak is in the optical fiber to be measured, and thereby only scattered light generated at a position associated with the correlation peak can be extracted, and a correlation peak can be moved in a longitudinal direction of the optical fiber to be measured by sweeping the modulation frequency of the continuous wave of light. A strain distribution or a temperature distribution in the longitudinal direction of the optical fiber to be measured can be measured by acquiring an amount of Brillouin frequency shift at correlation peaks while moving the correlation peaks.

In the above-described measuring method of the BOCDR method, since Brillouin scattered light in a narrow region of about several cm in an optical fiber to be measured can be selectively output as an interfering output associated with a specific position in a longitudinal direction of the optical fiber to be measured, the measuring method of the BOCDR can realize a spatial resolution which is two orders higher than that of the above-described measuring method of the BOTDR method. Also, since a continuous wave of light is incident on an optical fiber to be measured rather than an optical pulse, a signal intensity of backscattered light generated in the optical fiber to be measured is high, and thus it is easy to measure the signal intensity. Since a process of integrating backscattered light as in the measuring method of the BOTDR method is not needed, a measurement time can be reduced.

In a measuring method of a BOCDR method, since backscattered light generated in an optical fiber to be measured and reference light output by a light source are caused to interfere with each other, a signal intensity after the interference depends on polarization states of both of the lights. In the related art, polarization dependence has been reduced by providing a polarization scrambler (PSCR) which rotates a polarization plane at high speed on one of an optical path of reference light, an optical path of backscattered light, and an optical path of pump light to acquire a stable interference signal.

A PSCR is a device which averages influences of polarization states by changing the polarization states at high speed (at about a frequency of MHz). For example, an observed Brillouin gain spectrum (BGS) does not depend on a relative polarization state between reference light and backscattered light by providing a PSCR on an optical path of the reference light. The polarization states can be averaged by increasing an operation speed of the PSCR to a speed which is several tens of times faster than a sampling speed of backscattered light. However, since there is a limit to an operation speed of the PSCR, when the sampling speed of backscattered light is increased, an effect of the averaging is decreased, and unnecessary fluctuation depending on the polarization state thus appears in measurement data.

A method of eliminating an effect of polarization by performing measurement on an arbitrary polarization plane, performing measurement on a polarization plane which is rotated 90° with respect to the polarization plane, and acquiring the square root of a squared sum of the measured values, that is, acquiring a vector sum, is known as another method for reducing polarization dependence. The same effects as a PSCR can be acquired using this method. However, since there is a need to perform measurement twice by switching polarization planes, this method has a measurement time which is two times longer than when measurement is performed once. When a change of a polarization plane is slow and a sampling speed of backscattered light is slow, polarization states are substantially the same even if measurement is performed twice while switching polarization planes. Thus, the effect of polarization can be eliminated by acquiring the square root of the squared sum of the two measured values. However, when an optical fiber vibrates at a high speed or the like and the polarization plane is likely to rapidly rotate, the polarization states are changed between the two measurements. Thus, the effects of polarization cannot be eliminated even if the square root of the squared sum of the two measured values is acquired.

SUMMARY OF THE INVENTION

An aspect of the present invention provides an optical fiber characteristic measuring device capable of reducing a measurement time in a measuring method of a Brillouin optical correlation domain reflectometry (BOCDR) method.

An optical fiber characteristic measuring device according to one aspect of the present invention may includes a light source configured to generate a frequency modulated continuous wave of light, an optical divider configured to divide the frequency modulated continuous wave of light into first and second divided-waves of light, an optical waveguide configured to guide the first divided-wave of light to one end of an optical fiber to be measured, a first separator configured to separate a backscattered light generated by Brillouin scattering of the first divided-wave of light in the optical fiber to be measured into a first scattered light, which is a linearly polarized light, and a second scattered light, which is a linearly polarized light perpendicular to the first scattered light, a second separator configured to separate the second divided-wave of light into a first divided-sub-wave of light having an identical polarization state with the first scattered light and a second divided-sub-wave of light having an identical polarization state with the second scattered light, a first interferer configured to allow the first scattered light and the first divided-sub-wave of light to interfere with each other to generate a first beat component, a second interferer configured to allow the second scattered light and the second divided-sub-wave of light to interfere with each other to generate a second beat component, and a calculator configured to calculate characteristics of the optical fiber to be measured on the basis of the first beat component and the second beat component.

In the above-described optical fiber characteristic measuring device, the calculator may include a first analyzer configured to analyze the first beat component based on Brillouin scattered light generated at a first position in the optical fiber to be measured to generate a first spectrum, a second analyzer configured to analyze the second beat component based on the Brillouin scattered light generated at the first position to generate a second spectrum, a synthesizer configured to synthesize the first spectrum and the second spectrum to generate a synthetic spectrum, and a measure configured to measure characteristics of the optical fiber to be measured at the first position on the basis of the synthetic spectrum.

In the above-described optical fiber characteristic measuring device, the synthesizer may be configured to perform a process of adding a first component intensity obtained by squaring a component of the first spectrum at a frequency and a second component intensity obtained by squaring a component of the second spectrum at the frequency while changing the frequency to generate the synthetic spectrum.

In the above-described optical fiber characteristic measuring device, the calculator may further include a controller configured to control starting and stopping of the first analyzer and the second analyzer. When there are a plurality of correlation peaks, in which a frequency difference between the backscattered light and the second divided-wave of light is not temporally changed, in the optical fiber to be measured, the controller may control the starting and stopping of the first analyzer to measure a first spectrum of the first beat component associated with one correlation peak, which is needed and based on the Brillouin scattered light generated at the first position, among the plurality of correlation peaks, and control the starting and stopping of the second analyzer to measure a second spectrum of the second beat component associated with the correlation peak based on the Brillouin scattered light generated at the first position.

In the above-described optical fiber characteristic measuring device, the calculator may include an oscillator configured to generate a frequency signal, a first adjuster configured to adjust a first frequency band of the first beat component using the frequency signal to convert the first frequency band down to a second frequency band, the second frequency band being lower than the first frequency band, a second adjuster configured to adjust a third frequency band of the second beat component using the frequency signal to convert the third frequency band down to a fourth frequency band, the fourth frequency band being lower than the third frequency band, a first converter configured to convert the first beat component output from the first adjuster into a first power spectrum, a second converter configured to convert the second beat component output from the second adjuster into a second power spectrum, and a measure configured to measure characteristics of the optical fiber to be measured on the basis of the first power spectrum and the second power spectrum.

The above-described optical fiber characteristic measuring device may further include a third adjuster configured to adjust a first frequency band of one of the first and second waves of light to convert the first frequency band down to a second frequency band.

In the above-described optical fiber characteristic measuring device, the calculator may include a first converter configured to convert the first beat component into a first power spectrum, a second converter configured to convert the second beat component into a second power spectrum, and a measure configured to measure characteristics of the optical fiber to be measured on the basis of the first power spectrum and the second power spectrum.

In the above-described optical fiber characteristic measuring device, the first converter may be configured to perform a fast Fourier transform (FFT) on the first beat component to acquire the first power spectrum. The second converter may be configured to perform an FFT on the second beat component to acquire the second power spectrum.

In the above-described optical fiber characteristic measuring device, the first separator may be a polarizing beam splitter.

In the above-described optical fiber characteristic measuring device, the second separator may be a polarizing beam splitter.

In the above-described optical fiber characteristic measuring device, the first interferer may be configured to separate the first beat component into two beat components at a first ratio.

In the above-described optical fiber characteristic measuring device, the second interferer may be configured to separate the second beat component into two beat components at a second ratio.

The above-described optical fiber characteristic measuring device may further include a first photoelectric converter configured to convert one of the two beat components separated by the first interferer into electric signals, and a second photoelectric converter configured to convert the other of the two beat components separated by the first interferer into electric signals.

The above-described optical fiber characteristic measuring device may further include a third photoelectric converter configured to convert one of the two beat components separated by the second interferer into electric signals, and a fourth photoelectric converter configured to convert the other of the two beat components separated by the second interferer into electric signals.

The above-described optical fiber characteristic measuring device may further include a first amplifier configured to amplify the electric signals output from the first photoelectric converter and the second photoelectric converter and input the amplified electric signals into the calculator.

The above-described optical fiber characteristic measuring device may further include a second amplifier configured to amplify the electric signals output from the third photoelectric converter and the fourth photoelectric converter and input the amplified electric signals into the calculator.

In the above-described optical fiber characteristic measuring device, the calculator may be configured to calculate a strain distribution in a longitudinal direction of the optical fiber to be measured.

In the above-described optical fiber characteristic measuring device, the calculator may be configured to calculate a temperature distribution in a longitudinal direction of the optical fiber to be measured.

In the above-described optical fiber characteristic measuring device, the calculator may further include a local oscillator configured to supply a signal having a frequency to the first analyzer and the second analyzer.

An optical fiber characteristic measuring device of an aspect of the present invention acquires and synthesizes a first beat component associated with p-polarized light and a second beat component associated with s-polarized light from one continuous wave of light output by a light source in a measuring method of a BOCDR method, and measures characteristics of an optical fiber to be measured on the basis of the synthetic beat component. Thus, measured results which do not depend on a polarization state can be acquired in a short measurement time.

DETAILED DESCRIPTION OF THE INVENTION

Hereinafter, embodiments of a measuring device related to the present invention will be described with reference to the drawings.

First Embodiment

Figure 1:
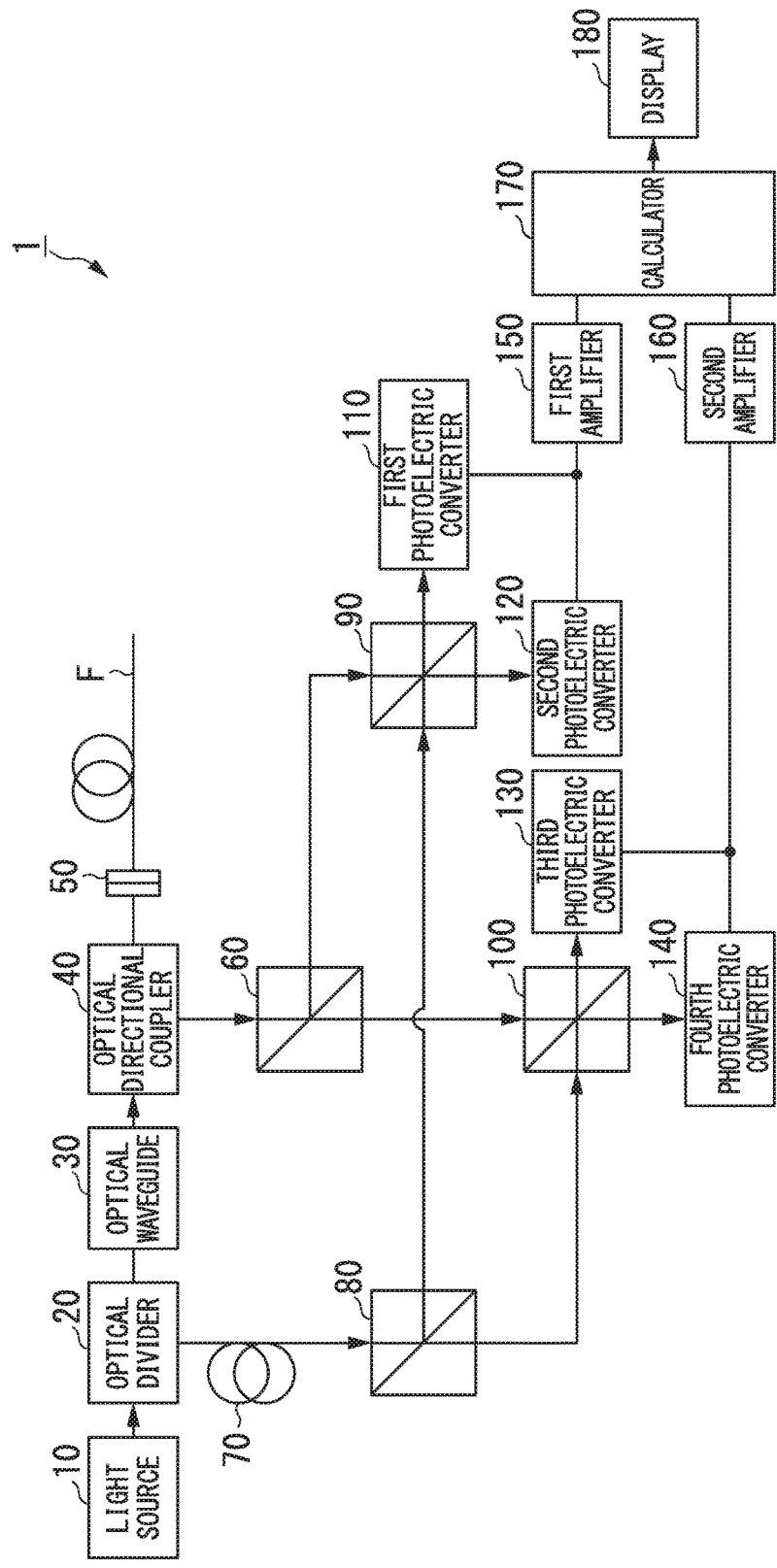
FIG. 1 is a block diagram showing a schematic constitution of an optical fiber characteristic measuring device in a first embodiment of the present invention.

FIG. 1 is a block diagram showing a schematic constitution of an optical fiber characteristic measuring device in a first embodiment of the present invention. As shown in FIG. 1, an optical fiber characteristic measuring device 1 of the first embodiment includes, for example, a light source 10, an optical divider 20, an optical waveguide 30, an optical directional coupler 40, an optical connector 50, a first optical separator 60, an optical delayer 70, a second optical separator 80, a first interferer 90, a second interferer 100, a first photoelectric converter 110, a second photoelectric converter 120, a third photoelectric converter 130, a fourth photoelectric converter 140, a first amplifier 150, a second amplifier 160, a calculator 170, and a display 180.

The light source 10 generates a frequency modulated continuous wave of light. The light source 10 includes, for example, a semiconductor laser (not shown) and a signal generator (not shown). For example, a distribution feedback type laser diode is used as the semiconductor laser. The signal generator applies a modulating signal, which makes continuous laser light output from the semiconductor laser into, for example, a frequency modulated continuous wave of light in a sinusoidal waveform, to the semiconductor laser. A signal obtained by superimposing an alternating current (AC) on a direct current (DC) is used as, for example, the modulating signal.

The optical divider 20 divides a continuous wave of light output from the light source 10 into two waves at an appropriate intensity ratio (for example, 1:1). One of the two waves is pump light incident on an optical fiber F to be measured. The pump light passes through the optical waveguide 30 and the optical directional coupler 40 and is incident on one end of the optical fiber F to be measured. The other wave of the two waves is reference light when optical heterodyne detection is performed. The reference light is incident on the optical delayer 70.

The optical waveguide 30 guides the pump light divided by the optical divider 20 to the optical fiber F to be measured via the optical directional coupler 40. The optical waveguide 30 may include, for example, an optical amplifier or the like for amplifying the pump light.

The optical directional coupler 40 emits pump light incident on an incident port from an emission/incident port and emits return light (backscattered light) from the optical fiber F to be measured incident on the emission/incident port via the optical connector 50 from an emission port. For example, an optical circulator or the like is used as the optical directional coupler 40.

The first optical separator 60 separates the backscattered light obtained when the pump light is incident on the optical fiber F to be measured into first scattered light serving as p-polarized light and second scattered light serving as s-polarized light. For example, a polarizing beam splitter or the like is used as the first optical separator 60. Since a polarization state of the backscattered light is undefined in accordance with states of the optical fiber F to be measured, an incident angle to the first optical separator 60 is also undefined.

The optical delayer 70 includes an optical fiber of a predetermined length. The optical delayer 70 sets a predetermined delay time between the pump light and the reference light. The delay time can be arbitrarily adjusted by changing lengths of optical fibers.

The second optical separator 80 separates the reference light passing through the optical delayer 70 into first reference light serving p-polarized light and second reference light serving as s-polarized light. For example, a polarizing beam splitter is used as the second optical separator 80. If the second optical separator 80 is a prism type polarizing beam splitter in which two right angle prisms are bonded, a polarization plane of the reference light in the second optical separator 80 is disposed such that the reference light is incident at an incident angle of 45° with respect to a bonding surface of the two right angle prisms.

The first interferer 90 allows the first scattered light serving as p-polarized light output from the first optical separator 60 and the first reference light serving as p-polarized light output from the second optical separator 80 to interfere with each other. Specifically, the first interferer 90 acquires a beat component associated with a p-polarized light component by multiplexing the first scattered light and the first reference light and separates the beat component into two beat components at a predetermined ratio (for example, 1:1). For example, a non-polarizing beam splitter is used as the first interferer 90.

The second interferer 100 allows the second scattered light serving as s-polarized light output from the first optical separator 60 and the second reference light serving as s-polarized light output from the second optical separator 80 to interfere with each other. Specifically, the second interferer 100 acquires a beat component associated with an s-polarized light component by multiplexing the second scattered light and the second reference light and separates the beat component into two beat components at a predetermined ratio (for example, 1:1). For example, a non-polarizing beam splitter is used as the second interferer 100.

The first photoelectric converter 110 and the second photoelectric converter 120 convert the two beat components associated with p-polarized light generated by the first interferer 90 into electric signals. Also, the third photoelectric converter 130 and the fourth photoelectric converter 140 convert the two beat components associated with s-polarized light generated by the second interferer 100 into electric signals.

The first amplifier 150 amplifies the electric signals output from the first photoelectric converter 110 and the second photoelectric converter 120 and inputs the electric signals into the calculator 170. Also, the second amplifier 160 amplifies the electric signals output from the third photoelectric converter 130 and the fourth photoelectric converter 140 and inputs the electric signals into the calculator 170.

The calculator 170 calculates the electric signals output from the first amplifier 150 and the second amplifier 160 and measures characteristics of the optical fiber F to be measured. For example, the calculator 170 measures a strain distribution, a temperature distribution, etc. in a longitudinal direction of the optical fiber F to be measured. The calculator 170 will be described below.

The display 180 visually displays characteristics of the optical fiber F to be measured by the calculator 170. For example, a display is used as the display 180.

Figure 2:
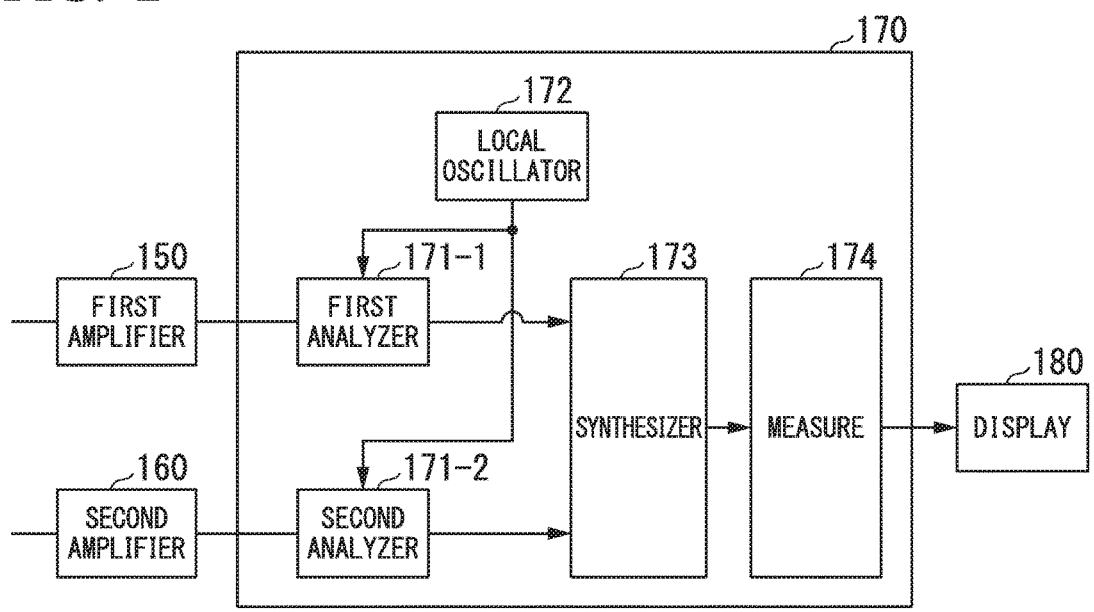
FIG. 2 is a block diagram showing a schematic constitution of a calculator included in the optical fiber characteristic measuring device in the first embodiment of the present invention.

FIG. 2 is a block diagram showing a schematic constitution of the calculator 170 included in the optical fiber characteristic measuring device 1 in the first embodiment. The calculator 170 includes, for example, a first analyzer 171-1, a second analyzer 171-2, a local oscillator 172, a synthesizer 173, and a measure 174.

The first analyzer 171-1 generates a first spectrum of a beat component (a first beat component) associated with a p-polarized light component based on Brillouin scattered light generated at a specific position (the first position) in the optical fiber F to be measured using an electric signal output from the first amplifier 150. The second analyzer 171-2 generates a second spectrum of a beat component (a second beat component) associated with an s-polarized component based on the Brillouin scattered light generated at the specific position (the first position) in the optical fiber F to be measured using an electric signal output from the second amplifier 160.

The local oscillator 172 supplies a signal of a predetermined frequency to the first analyzer 171-1 and the second analyzer 171-2. The first analyzer 171-1 converts a frequency band of the first beat component down to a predefined frequency band using the signal supplied from the local oscillator 172, and acquires a spectrum of the first beat component. For example, the first analyzer 171-1 converts a frequency of the first beat component from about 10.8 GHz down to about 30 MHz and acquires a spectrum of the first beat component (a first spectrum). Similarly, the second analyzer 171-2 converts a frequency band of the second beat component down to a predefined frequency band using the signal supplied from the local oscillator 172 and acquires a spectrum of the second beat component. For example, the second analyzer 171-2 converts a frequency of the second beat component from about 10.8 GHz down to about 30 MHz and acquires a spectrum of the second beat component (a second spectrum). Note that a description in which a process of converting a frequency is performed by the first analyzer 171-1, the second analyzer 171-2, and the local oscillator 172 is provided for the sake of simplicity here, but a constitution using several stages of analyzers and local oscillators may be used for the purpose of improving a spurious characteristic or the like. For example, two spectrum analyzers (electrical spectrum analyzers (ESAs)) which are synchronized can be used as the first analyzer 171-1, the second analyzer 171-2, and the local oscillator 172.

The synthesizer 173 generates a synthetic spectrum by synthesizing the first spectrum output from the first analyzer 171-1 and the second spectrum output from the second analyzer 171-2. The measure 174 measures characteristics of the optical fiber to be measured at the specific position (the first position) in the optical fiber F to be measured on the basis of the synthetic spectrum output from the synthesizer 173, and inputs the measured results into the display 180.

Figure 3:
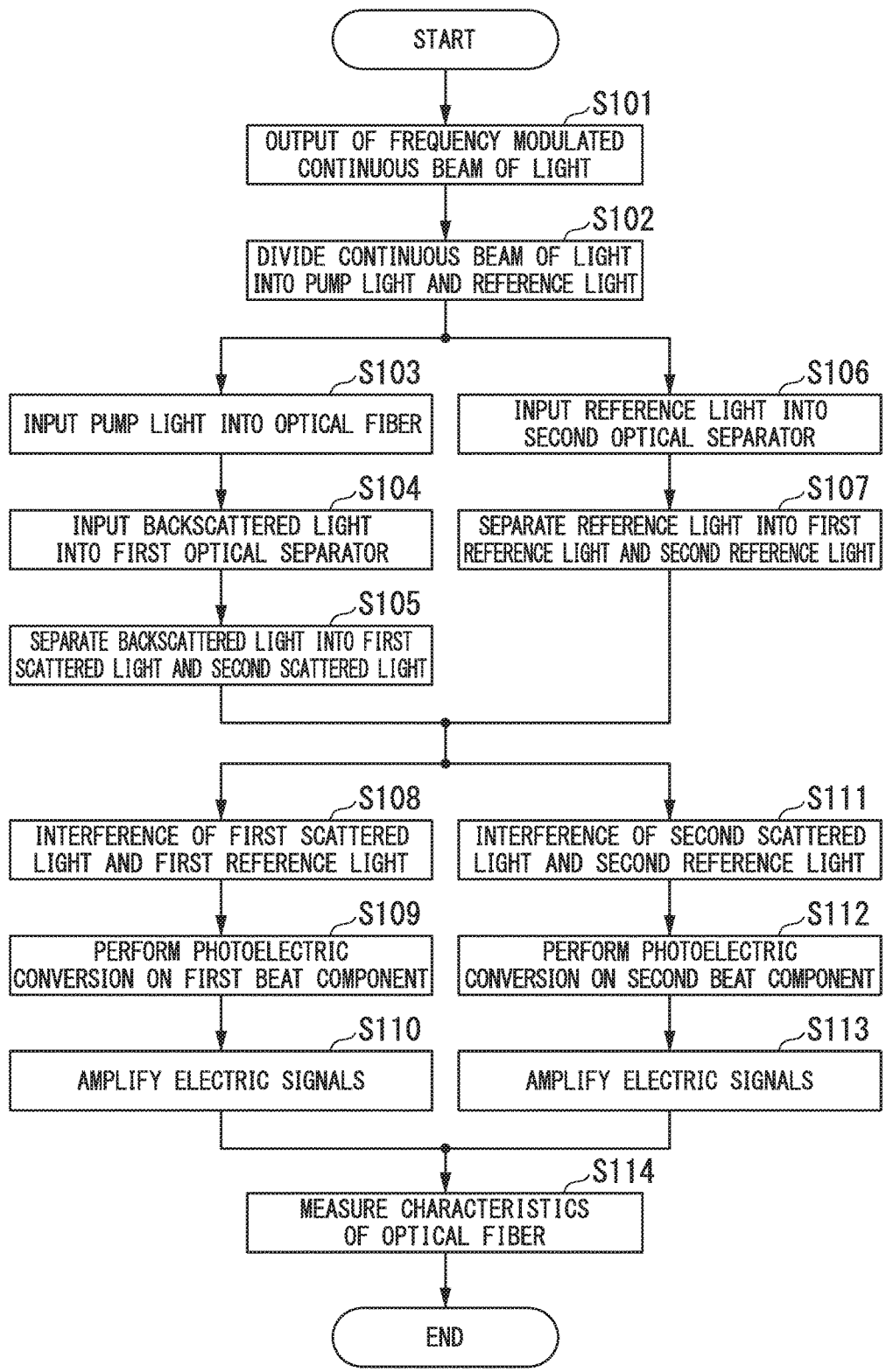
FIG. 3 is a flowchart showing an example of a flow of a process of the optical fiber characteristic measuring device in the first embodiment of the present invention.

Next, an operation of the optical fiber characteristic measuring device 1 of the first embodiment will be described. FIG. 3 is a flowchart showing an example of a flow of a process of the optical fiber characteristic measuring device 1 in the first embodiment.

The light source 10 inputs a frequency modulated continuous wave of light into the optical divider 20 (Step S101). The light source 10 inputs, for example, a frequency modulated continuous wave of light in a sinusoidal waveform into the optical divider 20.

Subsequently, the optical divider 20 divides the continuous wave of light output from the light source 10 into pump light and reference light (Step S102). The optical divider 20 inputs the pump light into the optical waveguide 30, and inputs the reference light into the optical delayer 70.

Subsequently, the optical waveguide 30 guides the pump light to the optical fiber F to be measured via the optical directional coupler 40 (Step S103). When the frequency modulated pump light is incident on the optical fiber F to be measured, Brillouin scattering is generated in the optical fiber F to be measured. Here, backscattered light generated due to Brillouin scattering is affected by an acoustic wave whose speed is changed depending on a strain or a temperature of the optical fiber F to be measured, and its frequency is thus shifted. If a wavelength of the light source 10 is about 1.55 μm and a general-purpose single mode fiber for communication is used as the optical fiber F to be measured, backscattered light from the optical fiber F to be measured is shifted by a frequency of about 10.8 GHz with respect to a frequency of the continuous wave of light incident on the optical fiber F to be measured. The amount of Brillouin frequency shift is changed in accordance with a strain or a temperature applied to the optical fiber F to be measured.

Subsequently, the optical directional coupler 40 receives the backscattered light from the optical fiber F to be measured and inputs the backscattered light into the first optical separator 60 (Step S104). Subsequently, the first optical separator 60 separates the backscattered light output from the optical directional coupler 40 into the first scattered light serving as p-polarized light and the second scattered light serving as s-polarized light (Step S105).

The reference light passing through the optical delayer 70 is input into the second optical separator 80 in parallel with Steps S103 to S105 or before or after Steps S103 to S105 (Step S106). Subsequently, the second optical separator 80 separates the reference light into the first reference light serving as p-polarized light and the second reference light serving as s-polarized light (Step S107). If the second optical separator 80 is a prism type polarizing beam splitter in which two right angle prisms are bonded, a polarization plane of the reference light in the second optical separator 80 is disposed such that the reference light is incident at an incident angle of 45° with respect to a bonding surface of the two right angle prisms.

Subsequently, the first interferer 90 allows the first scattered light serving as p-polarized light output from the first optical separator 60 and the first reference light serving as p-polarized light output from the second optical separator 80 to interfere with each other (Step S108). Specifically, the first interferer 90 generates a beat component associated with a p-polarized light component by multiplexing the first scattered light and the first reference light, and separates the beat component into two beat components at a predetermined ratio.

Subsequently, the first photoelectric converter 110 and the second photoelectric converter 120 convert the two beat components associated with p-polarized light generated by the first interferer 90 into electric signals (Step S109). Subsequently, the first amplifier 150 amplifies the electric signals output from the first photoelectric converter 110 and the second photoelectric converter 120, and inputs the electric signals into the calculator 170 (Step S110).

The second interferer 100 allows the second scattered light serving as s-polarized light output from the first optical separator 60 and the second reference light serving as s-polarized light output from the second optical separator 80 to interfere with each other in parallel with Steps S108 to S110 or before or after Steps S108 to S110 (Step S111). Specifically, the second interferer 100 generates a beat component associated with an s-polarized light component by multiplexing the second scattered light and the second reference light, and separates the beat component into two beat components at a predetermined ratio. Subsequently, the third photoelectric converter 130 and the fourth photoelectric converter 140 convert the two beat components associated with s-polarized light generated by the second interferer 100 into electric signals (Step S112). Subsequently, the second amplifier 160 amplifies the electric signals output from the third photoelectric converter 130 and the fourth photoelectric converter 140, and inputs the electric signals into the calculator 170 (Step S113).

Subsequently, the calculator 170 calculates the electric signals output from the first amplifier 150 and the second amplifier 160, and measures characteristics of the optical fiber F to be measured (Step S114). Specifically, the first analyzer 171-1 provided in the calculator 170 measures a first spectrum of the beat component (a first beat component) associated with the p-polarized light component based on Brillouin scattered light generated at a specific position (the first position) in the optical fiber F to be measured using the electric signal output from the first amplifier 150. Also, the second analyzer 171-2 provided in the calculator 170 measures a second spectrum of the beat component (a second beat component) associated with the s-polarized light component based on the Brillouin scattered light generated at the specific position (the first position) in the optical fiber F to be measured using the electric signal output from the second amplifier 160. Here, the local oscillator 172 supplies a signal of a predetermined frequency to the first analyzer 171-1 and the second analyzer 171-2. The first analyzer 171-1 converts a frequency band of the first beat component down to a predefined frequency band using the signal supplied from the local oscillator 172, and acquires a spectrum of the first beat component (the first spectrum). Also, the second analyzer 171-2 converts a frequency band of the second beat component down to a predefined frequency band using the signal supplied from the local oscillator 172, and acquires a spectrum of the second beat component (the second spectrum). Subsequently, the synthesizer 173 synthesizes the first spectrum output from the first analyzer 171-1 and the second spectrum output from the second analyzer 171-2, and generates a synthetic spectrum.

A process of the synthesizer 173 will be described below. The synthesizer 173 generates a synthetic spectrum by performing a process of adding a first component intensity (corresponding to power) obtained by squaring a component of the first spectrum (a frequency fx) and a second component intensity (corresponding to power) obtained by squaring a component of the second spectrum (the frequency fx) while changing the frequency fx. Also, a position to be measured in the longitudinal direction of the optical fiber F to be measured can be moved by adjusting a frequency of the frequency modulated continuous wave of light output by the light source 10. In this manner, characteristics in the longitudinal direction of the optical fiber F to be measured, for example, a strain distribution or the like, can be measured by sweeping the frequency of the frequency modulated continuous wave of light.

According to the optical fiber characteristic measuring device 1 of the first embodiment described above, a component of a first spectrum associated with p-polarized light and a component of a second spectrum associated with s-polarized light are acquired from one continuous wave of light output from the light source 10, a synthetic spectrum is generated by performing a process of adding a first component intensity (corresponding to power) obtained by squaring a component of the first spectrum (the frequency fx) and a second component intensity (corresponding to power) obtained by squaring a component of the second spectrum (the frequency fx) while changing the frequency fx, and characteristics of an optical fiber to be measured are measured on the basis of the synthetic spectrum. For this reason, measured results which do not depend on a polarization state can be acquired in a short measurement time. Also, since the local oscillator 172 is used by both of the first analyzer 171-1 and the second analyzer 171-2, a size of hardware can be reduced, and a frequency error between the first analyzer 171-1 and the second analyzer 171-2 can be eliminated.

Second Embodiment

Next, a second embodiment of the present invention will be described. Comparing the second embodiment with the first embodiment, an optical fiber characteristic measuring device of the second embodiment is different from that of the first embodiment in view of a constitution of a calculator 170. For this reason, in the description of the second embodiment, description of the same components as those of the first embodiment will be omitted or simplified.

Figure 4:
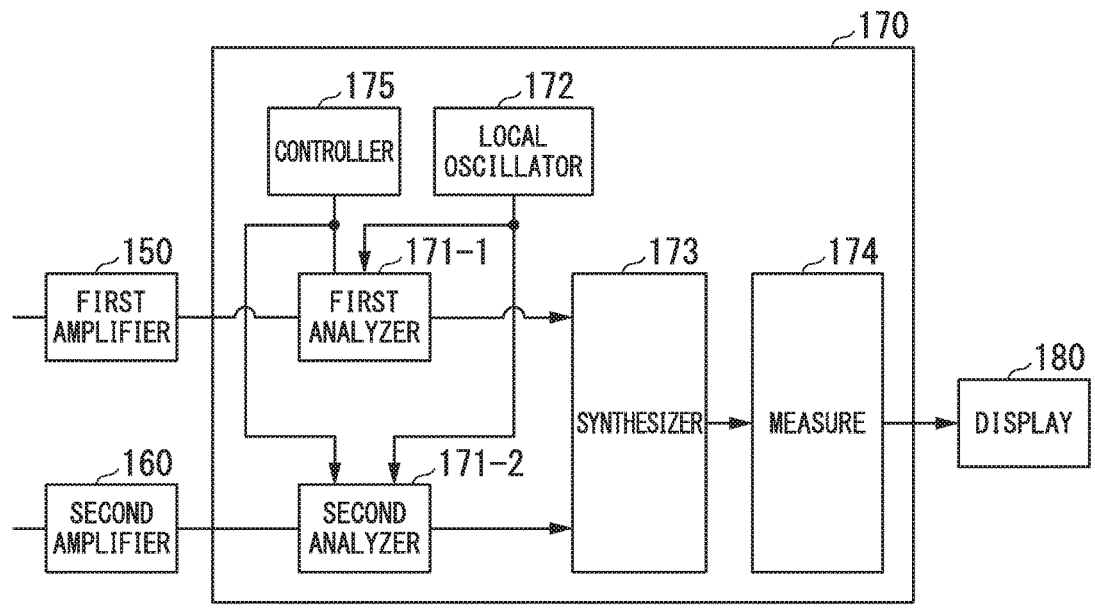
FIG. 4 is a block diagram showing a schematic constitution of a calculator included in an optical fiber characteristic measuring device in a second embodiment of the present invention.

FIG. 4 is a block diagram showing a schematic constitution of a calculator included in the optical fiber characteristic measuring device in the second embodiment of the present invention.

Only one correlation peak should be in an optical fiber F to be measured to observe characteristics at one specific position in the optical fiber F to be measured. For this reason, there is a need to increase a measurement range by reducing a modulation frequency of continuous wave of light output by a light source 10, and increasing an interval of a correlation peak compared to a length of the optical fiber to be measured. However, the increase of the measurement range leads to a decrease in spatial resolution. There is a need to increase modulation amplitude of the continuous wave of light to prevent the decrease in spatial resolution, but there is a limit to a magnitude of the modulation amplitude. Thus, when the optical fiber to be measured has a certain degree of length, it is difficult to measure the characteristics with high spatial resolution. Accordingly, in a measuring device in the related art, an electrical switch (a time gate means) is connected to a spectrum analyzer which measures characteristics of an optical fiber to be measured, and a timing at which measurement data is input into the spectrum analyzer is controlled using the electrical switch.

On the other hand, in the optical fiber characteristic measuring device in the second embodiment of the present invention, a controller 175 which controls starting and stopping of the first analyzer 171-1 and the second analyzer 171-2 is provided in the calculator 170 so that the characteristics can be measured even if the optical fiber F to be measured has the certain degree of length.

The controller 175 controls the starting and stopping of the first analyzer 171-1 and the second analyzer 171-2. When there are a plurality of correlation peaks in the optical fiber F to be measured, the controller 175 controls the starting and stopping of the first analyzer 171-1 and the second analyzer 171-2 such that the first analyzer 171-1 and the second analyzer 171-2 generate spectrums based on Brillouin scattering generated at a position to be measured of the optical fiber F to be measured associated with only a correlation peak among the plurality of correlation peaks.

According to the optical fiber characteristic measuring device of the second embodiment described above, the controller 175 is provided so that the electrical switch (the time gate means) in the related art is not necessary, and cost reduction and insertion loss can thus be improved.

Third Embodiment

Next, a third embodiment of the present invention will be described. Comparing the third embodiment with the first embodiment, an optical fiber characteristic measuring device of the third embodiment is different from that of the first embodiment in view of a constitution of a calculator 170. For this reason, in the description of the third embodiment, description of the same components as those of the first embodiment will be omitted or simplified.

Figure 5:
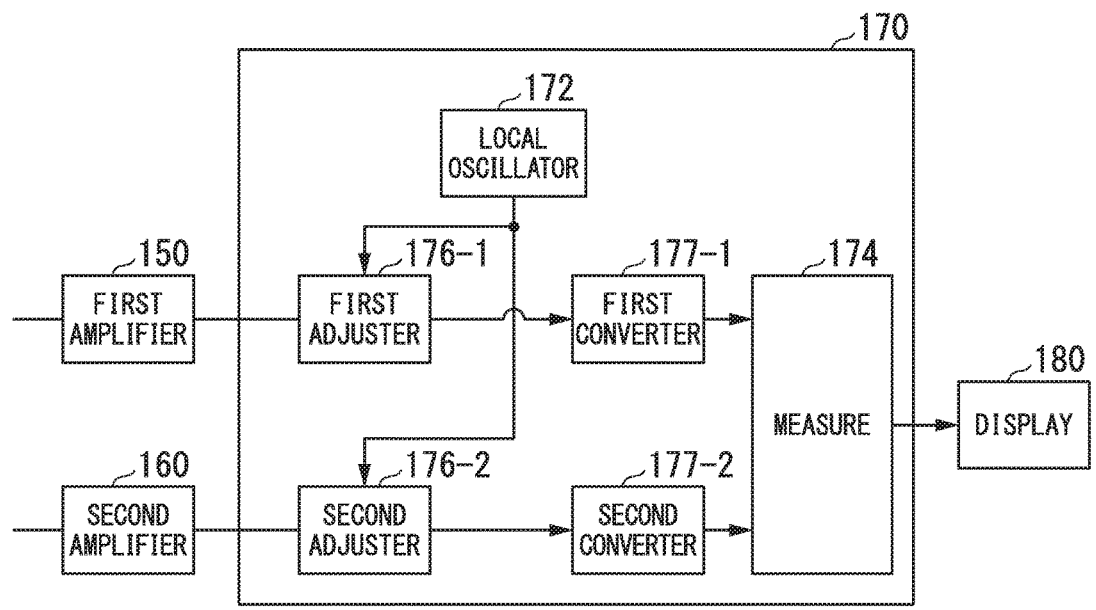
FIG. 5 is a block diagram showing a schematic constitution of a calculator included in an optical fiber characteristic measuring device in a third embodiment of the present invention.

FIG. 5 is a block diagram showing a schematic constitution of a calculator included in the optical fiber characteristic measuring device in the third embodiment of the present invention. The calculator 170 in the third embodiment includes a first adjuster 176-1, a second adjuster 176-2, a first converter 177-1, and a second converter 177-2 instead of the first analyzer 171-1, the second analyzer 171-2, and the synthesizer 173 in the first embodiment.

The first adjuster 176-1 converts a frequency band of a first beat component down to a predefined frequency band using a predetermined frequency signal output from a local oscillator 172. The second adjuster 176-2 converts a frequency band of a second beat component down to the predefined frequency band using the predetermined frequency signal output from the local oscillator 172. Since backscattered light and reference light have high frequencies which exceed 10 GHz, there is a need to convert frequencies of the backscattered light and the reference light into frequencies easy to deal with before a conversion process is performed in the first converter 177-1 and the second converter 177-2. For example, electric mixers are used as the first adjuster 176-1 and the second adjuster 176-2.

The first converter 177-1 converts the first beat component output from the first adjuster 176-1 into a first power spectrum. The second converter 177-2 converts the second beat component output from the second adjuster 176-2 into a second power spectrum. The first converter 177-1 and the second converter 177-2 perform, for example, a fast Fourier transform (FFT). The measure 174 measures characteristics in a longitudinal direction of an optical fiber F to be measured, for example, a strain distribution or the like, using the first power spectrum output from the first converter 177-1 and the second power spectrum output from the second converter 177-2.

According to the optical fiber characteristic measuring device of the third embodiment described above, measured results (characteristic data in the longitudinal direction of the optical fiber F to be measured) of backscattered light and reference light which do not depend on polarization states can be acquired using the first adjuster 176-1, the second adjuster 176-2, the first converter 177-1, and the first converter 177-2 in a short measurement time.

Fourth Embodiment

Next, a fourth embodiment of the present invention will be described. Comparing the fourth embodiment with the first embodiment, an optical fiber characteristic measuring device of the fourth embodiment is different from that of the first embodiment in view of provision of a third adjuster 190 between an optical divider 20 and an optical waveguide 30 and a constitution of a calculator 170. For this reason, in the description of the fourth embodiment, description of the same components as those of the first embodiment will be omitted or simplified.

Figure 6:
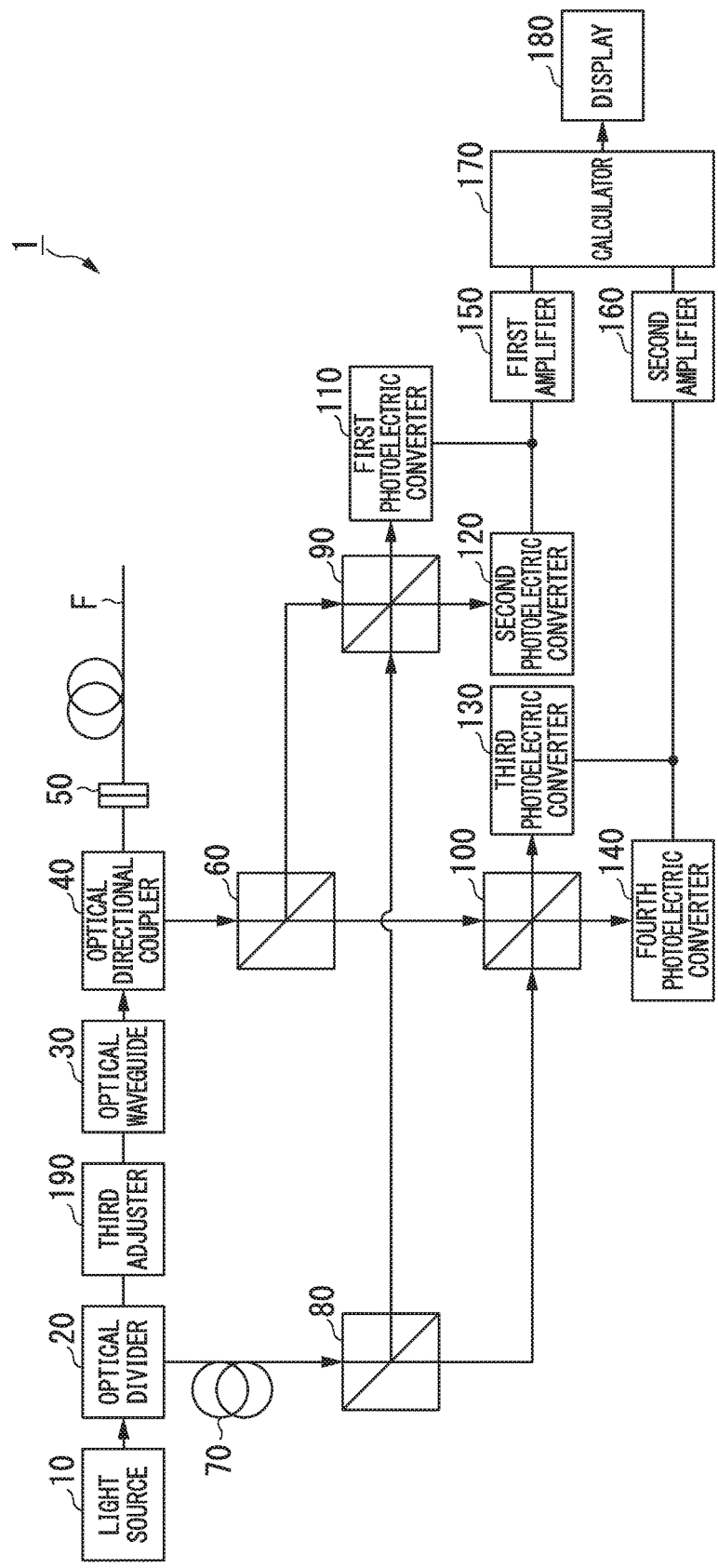
FIG. 6 is a block diagram showing a schematic constitution of an optical fiber characteristic measuring device in a fourth embodiment of the present invention.
Figure 7:
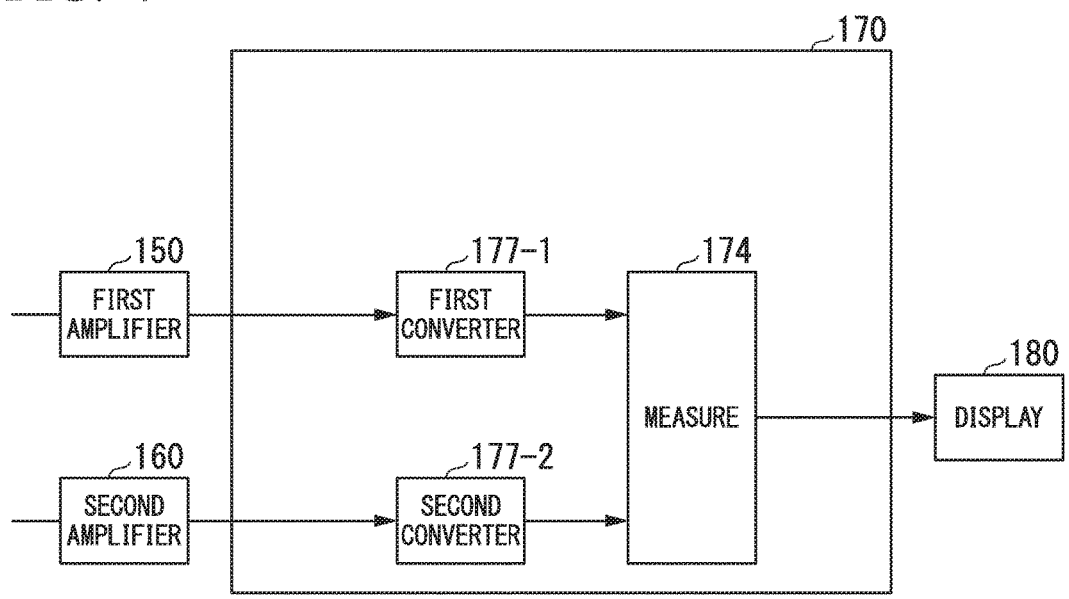
FIG. 7 is a block diagram showing a schematic constitution of a calculator included in the optical fiber characteristic measuring device in the fourth embodiment of the present invention.

FIG. 6 is a block diagram showing a schematic constitution of the optical fiber characteristic measuring device in the fourth embodiment of the present invention. FIG. 7 is a block diagram showing a schematic constitution of a calculator included in the optical fiber characteristic measuring device in the fourth embodiment of the present invention.

The third adjuster 190 converts a frequency of pump light output from the optical divider 20 up to or down to a predefined frequency. For example, a frequency shifter is used as the third adjuster 190. Also, the third adjuster 190 may be provided between the optical divider 20 and a second optical separator 80 to increase or reduce a frequency of reference light.

The calculator of the optical fiber characteristic measuring device in the fourth embodiment includes, for example, a first converter 177-1, a second converter 177-2, and a measure 174. The first converter 177-1 converts a first beat component associated with p-polarized light of backscattered light obtained when frequency converted pump light is incident on an optical fiber F to be measured and reference light into a first power spectrum. The second converter 177-2 converts a second beat component associated with s-polarized light of the backscattered light when the frequency converted pump light is incident on the optical fiber F to be measured and the reference light into a second power spectrum. The first converter 177-1 and the second converter 177-2 perform, for example, an FFT. The measure 174 measures characteristics in a longitudinal direction of the optical fiber F to be measured, for example, a strain distribution or the like, using the first power spectrum input the first converter 177-1 and the second power spectrum output from the second converter 177-2.

According to the optical fiber characteristic measuring device of the fourth embodiment described above, measured results (characteristic data in the longitudinal direction of the optical fiber F to be measured) of backscattered light and reference light which do not depend on polarization states can be acquired using the third adjuster 190, the first converter 177-1, and the second converter 177-2 in a short measurement time.

Although the foregoing has been a description of the preferred embodiments of the present invention with references made to the drawings, it is indisputable that the present invention is not limited to the embodiments described above. The various shapes of each component, the combination of the components, or the like described in the above-described embodiments is merely an example, and can be freely modified based on requirements of design or the like within the scope of the present invention. For example, the optical delayer 70 has been described as being provided between the optical divider 20 and the second optical separator 80, but may be provided between the optical divider 20 and the optical waveguide 30.

What is claimed is:

1. An optical fiber characteristic measuring device comprising:
    a light source configured to generate a frequency modulated continuous wave of light;
    an optical divider configured to divide the frequency modulated continuous wave of light into first and second divided-waves of light;
    an optical waveguide configured to guide the first divided-wave of light to one end of an optical fiber to be measured;
    a first separator configured to separate a backscattered light generated by Brillouin scattering of the first divided-wave of light in the optical fiber to be measured into a first scattered light, which is a linearly polarized light, and a second scattered light, which is a linearly polarized light perpendicular to the first scattered light;
    a second separator configured to separate the second divided-wave of light into a first divided-sub-wave of light having an identical polarization state with the first scattered light and a second divided-sub-wave of light having an identical polarization state with the second scattered light;
    a first interferer configured to allow the first scattered light and the first divided-sub-wave of light to interfere with each other to generate a first beat component;
    a second interferer configured to allow the second scattered light and the second divided-sub-wave of light to interfere with each other to generate a second beat component; and
    a calculator configured to calculate characteristics of the optical fiber to be measured on the basis of the first beat component and the second beat component,
    wherein the calculator comprises:
    a first analyzer configured to analyze the first beat component based on Brillouin scattered light generated at a first position in the optical fiber to be measured to generate a first spectrum;
    a second analyzer configured to analyze the second beat component based on the Brillouin scattered light generated at the first position to generate a second spectrum; and
    a controller configured to control starting and stopping of the first analyzer and the second analyzer,
    wherein when there are a plurality of correlation peaks, in which a frequency difference between the backscattered light and the second divided-wave of light is not temporally changed, in the optical fiber to be measured, the controller controls the starting and stopping of the first analyzer to measure a first spectrum of the first beat component associated with one correlation peak, which is needed and based on the Brillouin scattered light generated at the first position, among the plurality of correlation peaks, and controls the starting and stopping of the second analyzer to measure a second spectrum of the second beat component associated with the correlation peak based on the Brillouin scattered light generated at the first position.

2. The optical fiber characteristic measuring device according to claim 1, wherein the calculator comprises:
- a synthesizer configured to synthesize the first spectrum and the second spectrum to generate a synthetic spectrum; and
- a measurer configured to measure characteristics of the optical fiber to be measured at the first position on the basis of the synthetic spectrum.

3. The optical fiber characteristic measuring device according to claim 2, wherein the synthesizer is configured to perform a process of adding a first component intensity obtained by squaring a component of the first spectrum at a frequency and a second component intensity obtained by squaring a component of the second spectrum at the frequency while changing the frequency to generate the synthetic spectrum.

4. The optical fiber characteristic measuring device according to claim 1, wherein the first separator is a polarizing beam splitter.

5. The optical fiber characteristic measuring device according to claim 1, wherein the second separator is a polarizing beam splitter.

6. The optical fiber characteristic measuring device according to claim 1, wherein the first interferer is configured to separate the first beat component into two beat components at a first ratio.

7. The optical fiber characteristic measuring device according to claim 6, wherein the second interferer is configured to separate the second beat component into two beat components at a second ratio.

8. The optical fiber characteristic measuring device according to claim 7, further comprising:
- a first photoelectric converter configured to convert one of two beat components separated by the first interferer into electric signals; and
- a second photoelectric converter configured to convert the other of the two beat components separated by the first interferer into electric signals.

9. The optical fiber characteristic measuring device according to claim 8, further comprising:
- a third photoelectric converter configured to convert one of the two beat components separated by the second interferer into electric signals; and
- a fourth photoelectric converter configured to convert the other of the two beat components separated by the second interferer into electric signals.

10. The optical fiber characteristic measuring device according to claim 9, further comprising:
- a first amplifier configured to amplify the electric signals output from the first photoelectric converter and the second photoelectric converter and input the amplified electric signals into the calculator.

11. The optical fiber characteristic measuring device according to claim 10, further comprising:
- a second amplifier configured to amplify the electric signals output from the third photoelectric converter and the fourth photoelectric converter and input the amplified electric signals into the calculator.

12. The optical fiber characteristic measuring device according to claim 1, wherein the calculator is configured to calculate a strain distribution in a longitudinal direction of the optical fiber to be measured.

13. The optical fiber characteristic measuring device according to claim 1, wherein the calculator is configured to calculate a temperature distribution in a longitudinal direction of the optical fiber to be measured.

14. The optical fiber characteristic measuring device according to claim 1, wherein the calculator further comprises:
- a local oscillator configured to supply a signal having a frequency to the first analyzer and the second analyzer.

* * * * *